United States Patent
Britton et al.

(10) Patent No.: US 11,461,472 B2
(45) Date of Patent: Oct. 4, 2022

(54) AUTOMATIC CORRECTNESS AND PERFORMANCE MEASUREMENT OF BINARY TRANSFORMATION SYSTEMS

(71) Applicant: RUNSAFE SECURITY, INC., McLean, VA (US)

(72) Inventors: Doug Britton, Kensington, MD (US); Shane Paulsen Fry, Madison, AL (US); Andrew Murray, Athens, AL (US); Michael Wittner, Greenwich, CT (US)

(73) Assignee: RUNSAFE SECURITY, INC., McLean, VA (US)

( * ) Notice: Subject to any disclaimer, the term of this patent is extended or adjusted under 35 U.S.C. 154(b) by 0 days.

(21) Appl. No.: 17/622,130

(22) PCT Filed: Jun. 29, 2020

(86) PCT No.: PCT/US2020/040169
§ 371 (c)(1),
(2) Date: Dec. 22, 2021

(87) PCT Pub. No.: WO2020/264515
PCT Pub. Date: Dec. 30, 2020

(65) Prior Publication Data
US 2022/0207150 A1    Jun. 30, 2022

Related U.S. Application Data

(60) Provisional application No. 62/868,789, filed on Jun. 28, 2019.

(51) Int. Cl.
*G06F 7/04* (2006.01)
*G06F 21/57* (2013.01)
(Continued)

(52) U.S. Cl.
CPC .............. *G06F 21/577* (2013.01); *G06F 8/37* (2013.01); *G06F 11/3692* (2013.01); *G06F 2221/033* (2013.01)

(58) Field of Classification Search
CPC ...... G06F 21/577; G06F 8/37; G06F 11/3692; G06F 2221/033
See application file for complete search history.

(56) References Cited

U.S. PATENT DOCUMENTS

| | | | | |
|---|---|---|---|---|
| 6,223,337 B1 * | 4/2001 | Blume | .................... | G06F 8/443 717/130 |
| 8,595,832 B1 * | 11/2013 | Yee | ......................... | G06F 21/51 713/165 |

(Continued)

OTHER PUBLICATIONS

International Search Report and Written Opinion of International Application No. PCT/US2020/040619; dated Sep. 9, 2020; 6 pages.

*Primary Examiner* — Hang Pan
(74) *Attorney, Agent, or Firm* — Perkins Coie LLP

(57) ABSTRACT

Disclosed is a test engine intended to evaluate the correctness and measure the performance effects of a binary transformation technique. The disclosed system takes source code as input and compiler information/flags as input. The transformation-under-test is applied to the compiler, creating a transformed compiler. A random test case generator residing within the test engine for injecting illegal code structures to modify the project source code, build flags, or compiler's operating environment, thereby creating an unlimited number of input test cases for the compiler. The test engine compiles the source code utilizing both the raw and transformed compilers and compares the results. For example, the test engine renders a pass/fail judgement on the binary transformation based on a metric of near equivalence between the results of the raw compiler and transformed compiler. By using one or more bitmasks, the evaluation (Continued)

process factors in differences attributed to compiler run-time generated artifacts.

15 Claims, 12 Drawing Sheets

(51) Int. Cl.
*G06F 11/36* (2006.01)
*G06F 8/30* (2018.01)

(56) References Cited

U.S. PATENT DOCUMENTS

| | | |
|---|---|---|
| 8,762,964 B2 | 6/2014 | Turner et al. |
| 10,248,792 B1 | 4/2019 | Moritz et al. |
| 2011/0154304 A1* | 6/2011 | Fulton ................ G06F 11/3419 |
| | | 717/140 |
| 2013/0139137 A1* | 5/2013 | Zhao ...................... G06F 8/443 |
| | | 717/158 |
| 2014/0040666 A1* | 2/2014 | Goetz ................ G06F 11/3688 |
| | | 714/E11.178 |

* cited by examiner

FIG.8

| Compiler Name (212) | Compiler Version (214) | Baseline Operating Environment (216) | ISA (218) | Date Added (220) | Universe of Possible Compiler Flags (222) | Docker Container Id (224) | Compiler-specific bitmask ID (226) | GUID (228) | Compiler Source Project ID (235) |
|---|---|---|---|---|---|---|---|---|---|
| gcc | 9.1 | CentOS | x86 | 4/12/2019 | | | BM_GCC9.10x86 | {123} | |
| llvm | 8 | Ubuntu 16.04 | ARM64 | 5/23/2019 | | | BM_LLVM8.00A64 | {123} | |

FIG.9

| Raw Compiler GUID (312) | Raw Compiler Name (314) | Transformations Applied & Version (316) | Date Transformed (318) | Docker File (320) |
|---|---|---|---|---|
| {123} | gcc | Source-based CFI, v2.1 | 5/1/2019 | |
| {123} | gcc | Binary-based BBR, v7.1 | 4/25/2019 | | user@ubuntu:~/Documents/compiler_test_harness/helloworld$ readelf -n hello1 ⎬ 810

Displaying notes found at file offset 0x00000274 with length 0x00000024:
  Owner        Data size         Description
  GNU         0x00000014        NT_GNU_BUILD_ID (unique build ID bitstring) ⎬ 811
    Build ID: 567e777af065d51abe5efca3aedfd62e58da3a1d user@ubuntu:~/Documents/compiler_test_harness/helloworld$ cmp -l hello1 hello2 | gawk ⎬ 812
'{printf "%08X %02X %02X\n", $1-1, strtonum(0$2), strtonum(0$3)}'

```
TimeStamp 0x002229ef-0x00222a02
- offset -   0 1  2 3  4 5  6 7  8 9  A B  C D  E F   0123456789ABCDEF
0x002229ef   3132 3a30 323a 3332 0041 7072 2020 3820  12:02:32.Apr  8  *    ⎬ 815
0x002229ff   3230 3139 0075 6e64 6566 396e 6564 0000  2019.undefined.. *
```

FIG.12

AUTOMATIC CORRECTNESS AND PERFORMANCE MEASUREMENT OF BINARY TRANSFORMATION SYSTEMS

CROSS-REFERENCE TO RELATED APPLICATION(S)

The present application is 371 National Stage Application of International Application No. PCT/2020/040169, filed Jun. 29, 2020, which claims priority to U.S. Provisional Patent Application No. 62/868,789 filed on Jun. 28, 2019, the disclosures of which are incorporated herein by reference in their entirety.

TECHNICAL FIELD

This disclosure is related to verification of code transformations. More particularly, the embodiments disclosed herein are directed at systems, apparatuses, and methods for assessing the effectiveness and correctness of a binary transformation system.

BACKGROUND

As consumers, corporations, and governments increasingly rely on software and devices to add convenience, automate tasks, and support infrastructure, vulnerabilities in the software can be an issue. If the vulnerabilities are weaponized as an exploit, then this may lead to undesirable consequences. For example, in some scenarios, consumer privacy to be threatened. In certain scenarios, they can result in financial solvency. This can cause even bigger problems in systems which are vital for existence, such as utilities and military systems. Software operating on a computer, cloud network, or embedded on a device, such as phones, traffic lights, and vehicle engine management systems, may be attacked in different ways. For example, a copy of an operating system ("OS") is the same on millions of phones, hundreds of thousands of cars, etc. A hacker can acquire a device representative of an eventual target to craft attacks. Using that device, the hacker may study and reverse-engineer the software on the device looking for weaknesses and vulnerabilities.

Because identical software resides on multiple devices, multiple devices have an identical vulnerability and the same exploit may be distributed across the population. The software on the devices may include machine code, batch files, or a series of script-based statements. Further, the software can be executed by the device at any stage, such as boot-up, user executed, or other conditional based scenarios.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure but are intended to be illustrative only.

FIG. 8 shows an example of a raw compiler database.

FIG. 9 shows an example of a transformed compiler database.

FIG. 11 shows an example of a project-specific bitmask.

FIG. 12 shows an example of a compiler bitmask.

DETAILED DESCRIPTION

Figure 1:
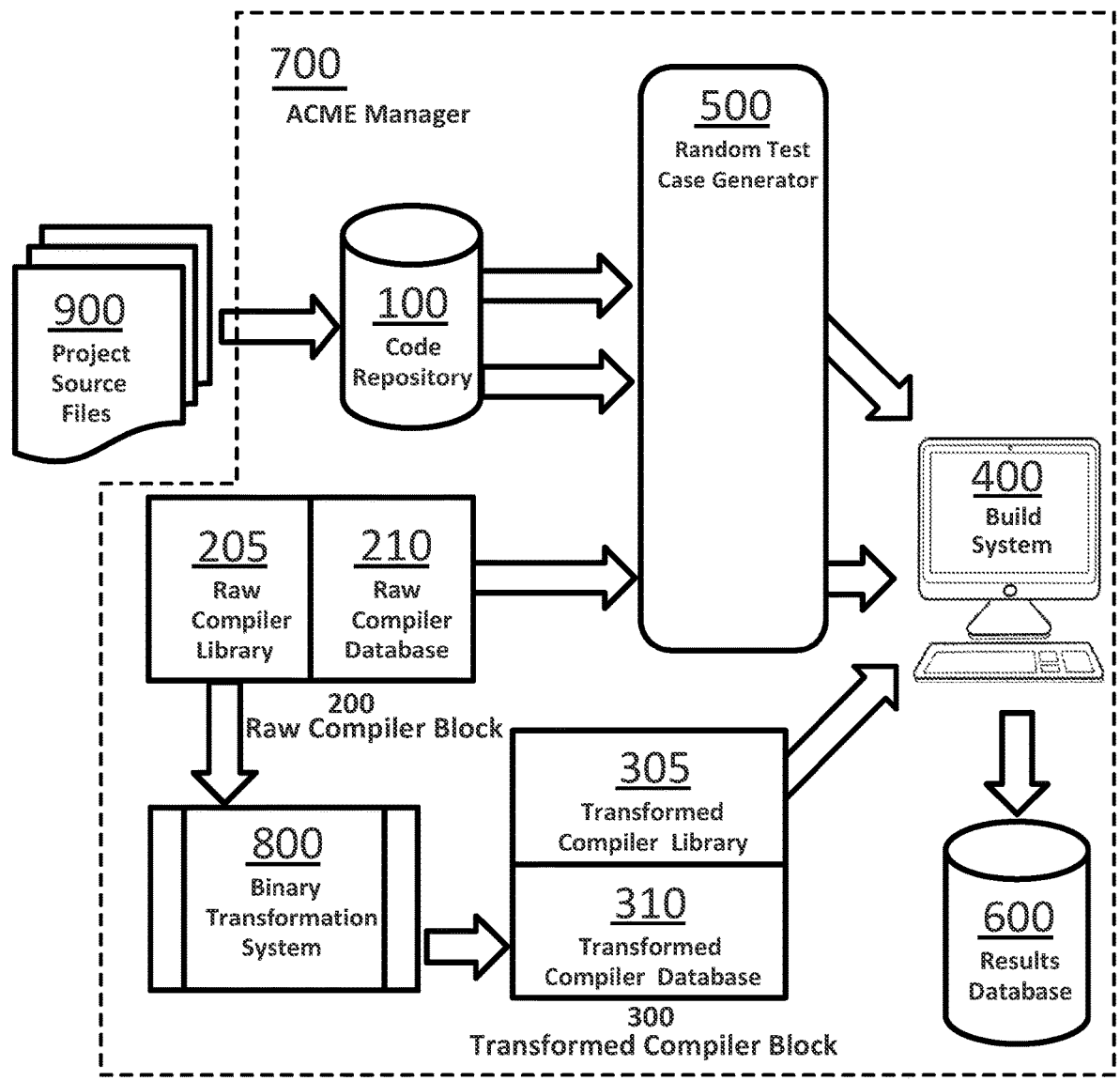
FIG. 1 shows a high-level system diagram depicting the architecture of the disclosed automated correctness and measurement engine (ACME).

The present disclosure pertains to systems and methods of verification for assessing the effectiveness and correctness of a binary transformation technique that facilitates transformation of binary files into transformed binary files. Also disclosed is a system and method for inserting functionally inert markers (e.g., project build ID, compiler version, or time stamp) into a transformed binary file. The inserted makers can be used to identify the transformation technique and/or provide relevant information about the transformation technique at runtime. The systems and methods of the present disclosure are universally applicable to any operating system and processor architecture.

Binary Transformations

To reduce the vulnerability of an executable, library, or other binary file (generally referred to herein as program binary) from mass manipulation by a hacker or an unauthorize users, a transformation of the binary file can be performed to create unique, but functionally identical, versions of the binary file, (otherwise referred to as transformed binary files). The transformation of the binary file may be achieved by using a binary transformation system or technique (alternatively referred to herein as BTS). A transformed binary (or, transformed software) is an internally reorganized yet functionally identical, unique image of the original binary file (e.g., machine code such as an executable or dynamic link library). A BTS applies a transformation to a binary file by scrambling the underlying software code such that entry points for vulnerabilities are limited to devices having identical images.

Although BTSs facilitate in reducing the vulnerability of a cyberattack on program binaries, demonstrating the effectiveness (or otherwise, the validity) of a binary reorganization of compiled software can be challenging. The complexity arising from the large number of different code paths in program binaries and the size of modern applications makes it difficult to confidently state that transformed program binaries with different hashes have same outcomes as the original program binary.

Additionally, although binary transformations are ideally supposed to be discrete, closed-form changes that don't change program behavior, in practice, errors can occur during transformation of the original software that cause changes in behavior when the software is executed. Some examples of errors which occur during a transformation include incorrectly identifying functions and/or incorrectly identifying data and instructions. When the binary transformation incorrectly identifies functions, the system modifies the code such that when executing certain parts of the program, the wrong functions gets executed and as a result, unexpected behavior can occur. If a transformation incorrectly identifies data and instructions, the resulting code can include instances where data can appear to be an instruction or a system may interpret data as a part of an instruction. In either case, the outcome of executing the transformed software is different than its intended purpose. Thus, there is a need to design systems that can demonstrate the validity of a binary transformation.

Binary transformations applied to software are supposed to be "inert" and increase confidence that the software cannot be successfully manipulated. To remain inert, the transformed software needs to generate the same outputs as the original software. For example, inertness can be tested by comparing outputs of the original software and the transformed software, for a given set of inputs.

Further, transformations can affect how the program is represented in random access memory (RAM). For example, as a result of transformations, functions and data may get relocated and/or restructured, and a goal for the transformation would be to have minimum negative impact on memory utilization with respect to the original program. Because code of the original software gets modified, the size of the transformed software (e.g., resulting binary) can be larger or smaller. The transformation can increase file size by adding instructions, if the resulting program needs additional instructions to perform the same behavior, or alternatively condense the code resulting in a smaller file size. Thus, the impact of a transformation can be assessed using memory utilization metrics.

The transformation may also affect the execution time and/or compilation time of a specific task or function by injecting instructions or as a result of re-organization of the program or data structure. For example, if the transformation adds instructions (such as for control flow integrity) overall execution of these instructions can negatively increase the execution time. As another example, re-organization of the program may result in extended branch instructions or memory bank access leading to increased instruction cycle times. Thus, the impact of a transformation needs to be assessed using execution time or compilation time metrics.

The protections added by binary transformation systems or techniques can include Basic Block Randomization (BBR), Stack Frame Randomization (SFR), and Control-Flow Integrity (CFI), or other suitable types of protection. Basic Block Randomization makes each protected system and device functionally identical yet logically unique. BBR is typically done by reordering basic blocks inside of a function. Stack Frame Randomization creates stack-level entropy by randomizing the buffer set aside for local variables when functions are instantiated on the stack. This entropy deprives an attacker of the information needed to craft a payload that weaponizes a stack overflow vulnerability. Control-Flow Integrity ensures that code can execute the same way every time which ensures there are not any unintended behaviors from the user.

Measuring Correctness or Equivalence of Binary Transformations

One basis for characterizing "equivalence" between the original binary file and the transformed binary file is by verifying that outcomes are the same for a complete set of inputs. That is, the outcomes of the original binary file and the transformed binary file can be compared for a common set of inputs applied to the original and transformed binary file. This input/output matching test, however, can only be done for relatively small programs with well-defined inputs and outputs. It would be impractical for BTS developers to design application-specific software which accepts a nearly infinite arrangement of inputs and provides in-depth comparison of outcomes. For these reasons, the breadth of test coverage for a specific test application is limited.

Using Compilers and Interpreters to Test Validity of a BTS

In some embodiments disclosed herein, a compiler can be used to test the validity of a binary transformation system. By subjecting a compiler to undergo binary transformations, multiple versions of the compiler can be created. The compiler can be subjected to undergo binary transformations by applying binary transformations to the original executable binaries of the compiler or the pre-compiled source code of the compiler (collectively referred to herein as raw compiler). The resulting transformed compilers are referred to herein as BTS_Image1, BTS_Image2, BTS_Image3, and so on.

In some implementations, a high-level software (e.g., an application program) can be compiled by both the raw compiler and the transformed compilers to provide results that can be compared for testing the validity of the BTS.

When performing a comparison between the output results of the various compilers (raw compiler, transformed compiler 1, transformed compiler 2, etc.), it is desirable to identify criteria for pass/fail verification. Due to the nature of a binary transformation systems, there may be outcomes, such as altered performance metrics, that when taken into account, cause the transformation to fall outside of the common definition of identical. Transformations can affect how the program is represented in RAM—for example, functions and data may relocated and/or restructured. The transformation may also affect the execution time of the specific task or function by injecting instructions, or as a result of re-organization of the program or data structure. The transformation can increase the executable program file size by adding instructions if the resulting program needs additional instructions to perform the same task, or alternatively condense the code resulting in a smaller file size. Because of the above-mentioned reasons, it is not appropriate to assert a pass/fail criterion based on "absolute identical" results of comparison. Herein, when comparing the results of the raw compiler, transformed compiler 1, transformed compiler 2, etc., this disclosure utilizes the term "near-equivalence" or "nearly-equivalent" interchangeably, and with the meaning that the outcome of the compile event has derived identical results, including machine code output, system status, and standard output (messages, warnings, errors, etc.), with the exception of potentially altered performance metrics and/or build-time artifacts.

Patentable benefits of using a compiler for assessing the effectiveness of a binary transformation system include the complexity and size of the compiler, the availability and variety of source code available as inputs into the compiler, and the amount of detailed information provided as output which can be easily evaluated by an automated testing platform. Compilers are typically much larger than applications and provide complex error checking against the input project source files. Compilers exist across different instruction set architectures and operating systems allowing similar testing methodology to be implemented.

Beyond altered performance metrics, a compiler may be designed to produce build-time artifacts, such as flags, markers, and/or extraneous meta-data, into the resulting machine code. These artifacts are essentially benign from the standpoint of the intended functionality of the executable program. Often the build artifacts (static or dynamic) will be constrained to information in the header portion of the binary file but may occur anywhere.

One example of a static build-time artifact can be metadata identifying the compiler version, which may reside in the compiled machine code, but does not change from one build to the next given identical inputs. Static build-time artifacts existing in the compiled machine code do not change in repeated compilations of the source code (along with associated parameters and files). In some embodiments, the disclosed technology applies a bitmask to selectively ignore static build-time artifacts.

A dynamic build-time artifact (such as a system timestamp of the compile operation) placed within the resulting machine code would not be identical for repeated builds even utilizing the same project source code and compiler. that Thus, dynamic build-time artifacts change over repeated compilations of the source code. Accordingly, in embodiments disclosed herein, a bitmask (e.g., created on-the-fly by the system or pre-determined) is applied to the compilation output (e.g., hex files) to mask out locations of dynamic build-time artifacts.

In some embodiments, both static and dynamic build-time artifacts can be bit masked to include transformation data. In some embodiments, static build-time artifacts existing in the compiled machine code do not change in repeated compilations of the source code regardless of which type of compiler (e.g., raw compiler or transformed) is used for compilation. Dynamic build-time artifacts change over repeated compilations of the source code in either instance, i.e., when the raw compiler or the transformed compiler is used for the compilations.

In order to include the transformation data, the build-time artifacts are cleared out by performing an AND with zeros. The transformation data can then be written into the cleared data using an OR operation. One patentable benefit of inserting a marker in this manner is that the transformation data in the inserted marker does not alter or affect the execution of the binary because the data that was cleared (e.g., build-time artifacts) did not affect the original execution of the program.

For the purpose of illustrating the disclosed concepts, non-limiting examples are provided. Common tasks, such as mathematical operations or placing results into memory, are understood to encompass a broad range of interpretations. Placing results into memory, for example, includes placing those results into local memory, remote memory, network-based storage, virtual memory residing on a hard-drive, RAM, flash, etc.

System Overview

FIG. 1 provides a high-level architecture of the automated correctness measurement engine (ACME). In some embodiments, the ACME can include an ACME manager 700, a code repository 100, a random test case generator 500, a raw compiler block 200, a binary transformation system 800, a transformed compiler block 300, a build system 400, and a results database 600. The raw compiler block 200 can include a raw compiler library 205 and a raw compiler database 210. The transformed compiler block 300 can include a transformed compiler library 305 and a transformed compiler database 300.

The ACME manager 700 can be a single computer server or a cluster of servers, physical or in the cloud, overseeing the automated process in which project source files 900 are input to the ACME, compiled by the raw compiler block 200, and then sent to build system 400. FIG. 1 also shows that the project source files 900 input to the ACME, are compiled by the transformed compiler(s) residing in the transformed compiler block 300. The binary transformation system 800 applies a binary transformation technique to the raw compiler (e.g., an image of the raw compiler) residing in the raw compiler block 200 to generate the transformed compiler block 300. One patentable benefit of the present technology is that the disclosed ACME can be used to assess the effectiveness of the binary transformation technique associated with the binary transformation system 800. The ACME manager 700 can provide an image of the raw compiler included in the raw compiler block 200 to the binary transformation system 800. A binary transformation is applied to the raw compiler by the binary transformation system 800, which results in generation or creation of one or more multiple transformed images of the raw compiler. The intent of the binary transformation system 800 is to reliably reorder the internal assembly structure of the raw compiler without breaking the intended functionality of the raw compiler. These transformed compilers 330 (e.g., denoted as BTS_Image1, BTS_Image2, BTS_Image3, etc.) are stored in the transformed compiler library 305.

The project source files 900 include the project source code (e.g., written in a high-level language like C or C++, necessary build parameters, proper compiler instruction, platform characterization (including target processor and OS information along with any project metadata 104) is copied into the code repository 100.

In some implementations, before passing into the build system 400, elements of the code repository 100 and raw compiler block 200 pass through a random test case generator 500 which introduces unique test scenarios into the build system 400. For example, the random test case generator 500 can inject illegal code structures into software code included in the project source files 900. It will be appreciated that the random test case generator 500 can simulate an unlimited number of random test cases applicable to determine the behavior of a raw compiler or a transformed compiler.

The outcomes of the compile processes performed by the build system 400 are logged and evaluated against pass/fail criteria in the results database 600. The build system 400 uses raw compiler block 200 to generate raw compiler test results data. The build system 400 uses transformed compiler block 300 to generate compiler test results data. In some implementations, a copy of the project source files 900 may be stored along with the raw test results data and/or the transformed test results data in the results database 600 for later analysis.

As an example, a raw compiler residing in the raw compiler block 200 can be the GNU Compiler Collection (gcc) and the operating system can be Ubuntu 16.04. The raw compiler library 205 may include a plurality of raw compiler images, such as Visual C++ by Microsoft, other open source compilers, or javac by Sun Microsystems. Details pertaining to the raw compiler are stored in the raw compiler database 210 which includes complete articulation of all possible compiler flags available and input characterization for the compile process, as well as the baseline operating environment (OS, kernel, processor) for each raw compiler included in the raw compiler block 200. A compiler typically works in conjunction with a specific operating system (e.g. Windows, Ubuntu, etc). One benefit of the disclosed technology is that when testing the effectiveness of a binary transformation system based on a type of compiler, the disclosed technology can ensure that the appropriate operating system associated with the compiler gets loaded onto memory.

Figure 2:
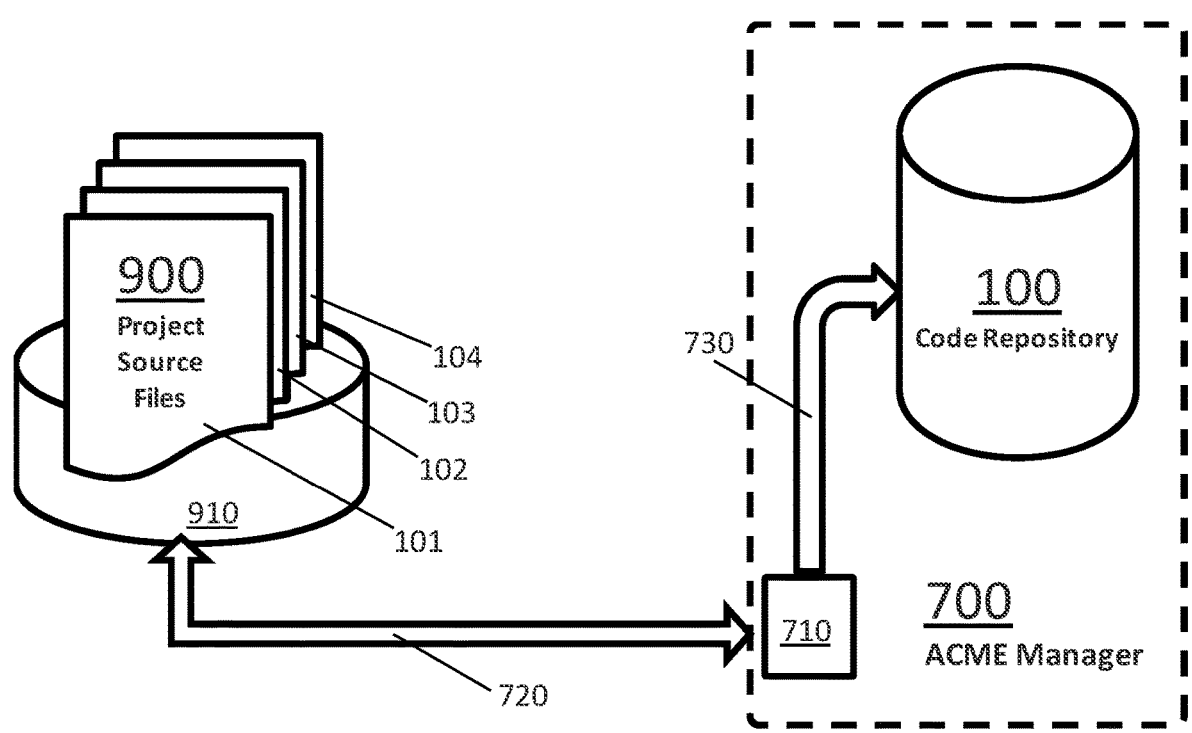
FIG. 2 shows an example of a source code repository.

FIG. 2 shows an example of a source code repository. For example, FIG. 2 shows the user provides project source files 900 which are compiled into machine code from the selected raw compiler 230. The project source files 900 can represent the basic units of test input for the ACME and includes the associated elements which would lead to correctly-built binary programs using one or more raw compilers and one or more transformed compilers. As shown in FIG. 2, the project source files 900 may comprise the project source code 101, proper compiler instructions 102, platform characterization 103, and project metadata 104. Project source files 900 may be present locally or remotely relative to the ACME. Examples of remotely accessible project source files 900 include open source repositories 910 such as GitHub and Yocto. Alternatively, the source repository 910 of project source files 900 may reside in a private collection. In implementations where the ACME pulls project source files 900 from these source repositories 910, new test cases may be created each time a user commits their code to the repository 910. Also shown in FIG. 2 is a communication block 710 and an external communication bus 720 to the source file repository 910 for electronic data communications.

The project source code 101 is a member of the project source files 900 and may include hundreds or thousands of lines of human-readable instructions which can be compiled to create executable machine code. The program "hello_world.c" is presented as an example of source code to illustrate the concept behind the disclosed technology. The hello_world project may include "main.c", a C-based source code with the contents shown below, and one header file, "stdio.h".

```
#include <stdio.h>
void main( )
{
printf("Hello World\n");
}
```

The hello_world project does not necessarily use the compiler extensively, and therefore it would not thoroughly test whether or not a compiler was transformed correctly. Another open source project that is well used and much more complex is Python. Python includes directories of all source files necessary for pre-build packages. It can also include configuration which should be the same if the raw compiler and the transformed compiler are on the same device. As another example, the Intel GNU C++ compiler currently supports the compiler option "use-msasm" that allows blocks of assembler to be assembled within the c program file. This option is not supported by the Microsoft Visual Studio C++ compiler.

Another member of the project source files 900 includes the proper or intended compiler instructions 102. The proper compiler instructions 102 facilitate successful compilation of the project source code 101 according to the programmer's preferences. The proper compiler instructions 102 may include flags that pertain only to a specific compiler—in which case, the specific compiler is specified as part of the project source file 900. For example, some of the GNU C Compiler flags are <std=c99, Wextra, Wno-unused-result, Wno-unused-parameter, Wno-missing-field-initializers>. As another example, the Intel C++ compiler currently supports the compiler option "use-msasm" that allows blocks of assembler to be assembled within the c program file, whereas this option is not supported by the Microsoft Visual Studio C++ compiler. Thus, the project source files 900 should specify that the intended compiler is Intel C++. As illustrated, not all compilers may have identical options or instructions, accordingly, the ACME manager 700 may reference a lookup table within the compiler database 210 to either qualify an appropriate compiler or cross reference build instructions between compilers.

The project source files 900 may also include platform characterization 103. The platform characterization 103 includes information regarding the intended compiler, target operating system such as version number and type of operating system, and target processor architecture. The intended compiler may include a subset of available compliers stored in the complier library. The target operating system may include Windows, Linux, MacOS—as well as specific version information of the operating system. The target processor architecture may be specific such as Intel x86 or x64, embedded systems with 8, 16, or 32-bit processor cores, Power PC, etc. The same project source files 900 may also include multiple platform characterization 103 so that the same project source files 900 may be compiled across a plurality of platforms with similar or varying options. For example, platform characterization 103 can include a mapping between the source code and the operating environment for the compiled program. Each mapping can include an intended compiler, a target operating system, and a target processor architecture. These mappings will tell the build system 400 which computational "ecosystem" (combination of a compiler, operating system, and processor architecture) to run.

In some implementations, the project source files 900 may include various project metadata 104, which may not affect the functionality of the project source files 900, but can be useful to the programmer or development community. As an example, the project metadata 104 may include information such as a URL listing the source of the project, the date the project was added to the repository, the total source lines of code (SLOC), and/or the data, time, and results of systems tests using this project. In some embodiments, the project source files 900 may include a project specific bitmask 105 which identifies specific bytes that are not required for assessing the effectiveness of one or more binary transformation techniques.

Figure 3:
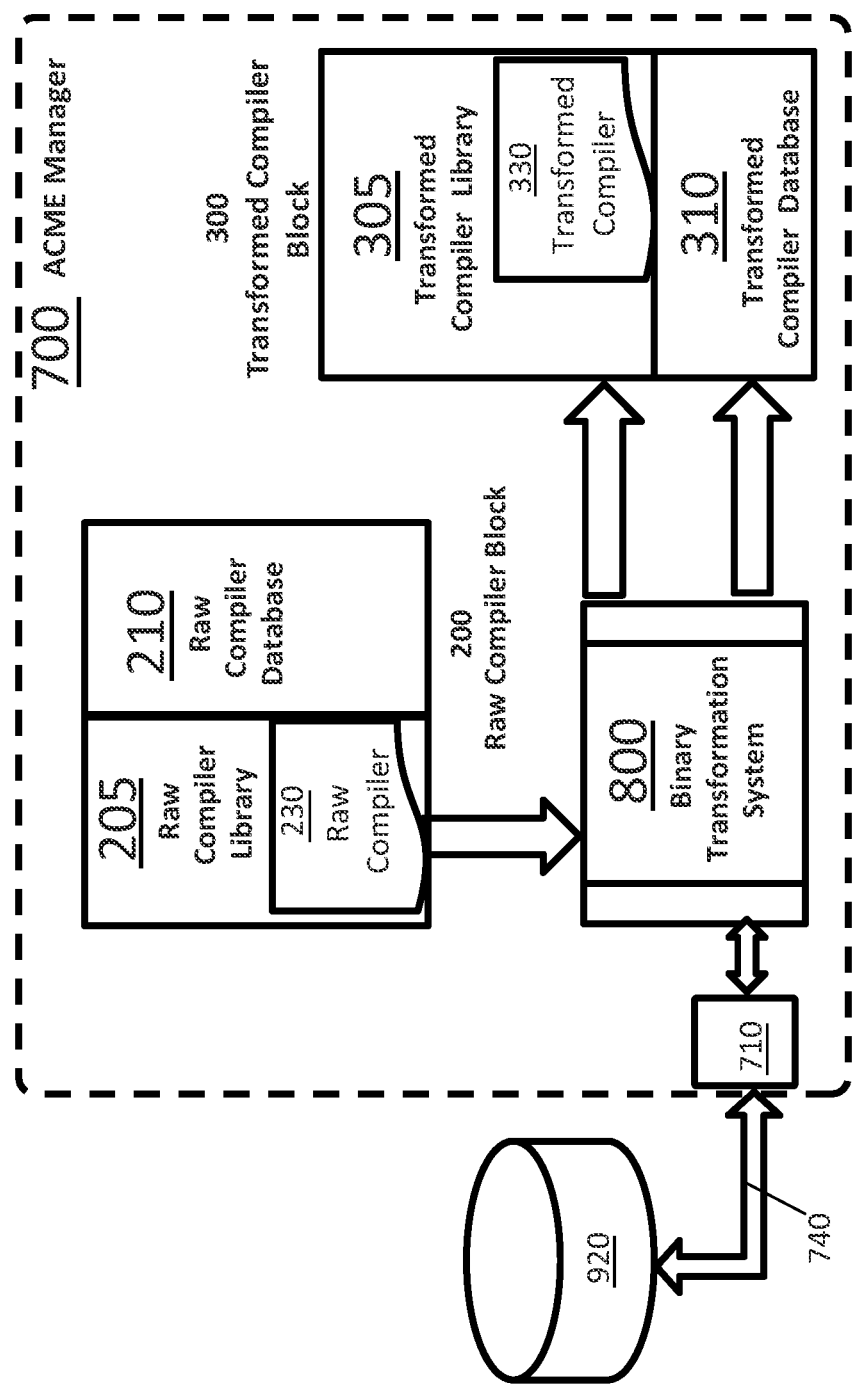
FIG. 3 shows an example of a binary transformation system.

FIG. 3 shows an example of a binary transformation system. For example, FIG. 3 shows that the raw compiler 230 included in raw compiler block 200 is converted into a transformed compiler 330 included in the transformed compiler block 300. Various transformations techniques may be applied to a raw compiler 230 to create one or more transformed compilers 330. Examples of transformation techniques include block-level binary randomization (BBR), stack frame randomization (SFR), and code flow integrity (CFI). In some implementations, a combination of two or more binary transformation techniques may be applied for transforming the raw compiler 230, e.g., applying a combination of CFI and BBR.

As shown in FIG. 3, the transformed compiler library 305 and transformed compiler database 310 may be linked to a transformation system developer repository 920, such that new binary transformations may be automatically tested by the ACME upon the developer repository 920 receiving a flag such as commit. Also shown in FIG. 3 is a communication block 710 and an external communication bus for accessing the binary transformation developer repository 920.

To further illustrate FIG. 3, a raw compiler 230, (such as gcc) may be taken from the raw compiler library 205, passed through a binary transformation system 800 (which applies a transformation technique), and the resulting transformed compiler 330 image stored into the transformed compiler library 305. In this example, a transform of raw compiler 230 adding in control flow may produce BTS_gcc1, a transform of raw compiler 230 adding in stack frame randomization may produce BTS_gcc2, and a transform of the raw compiler 230 adding in control-flow integrity and stack frame randomization may produce BTS_gcc3. The transformed compiler 330 image or images become the system test harness whose performance is being characterized by the ACME.

Figure 4:
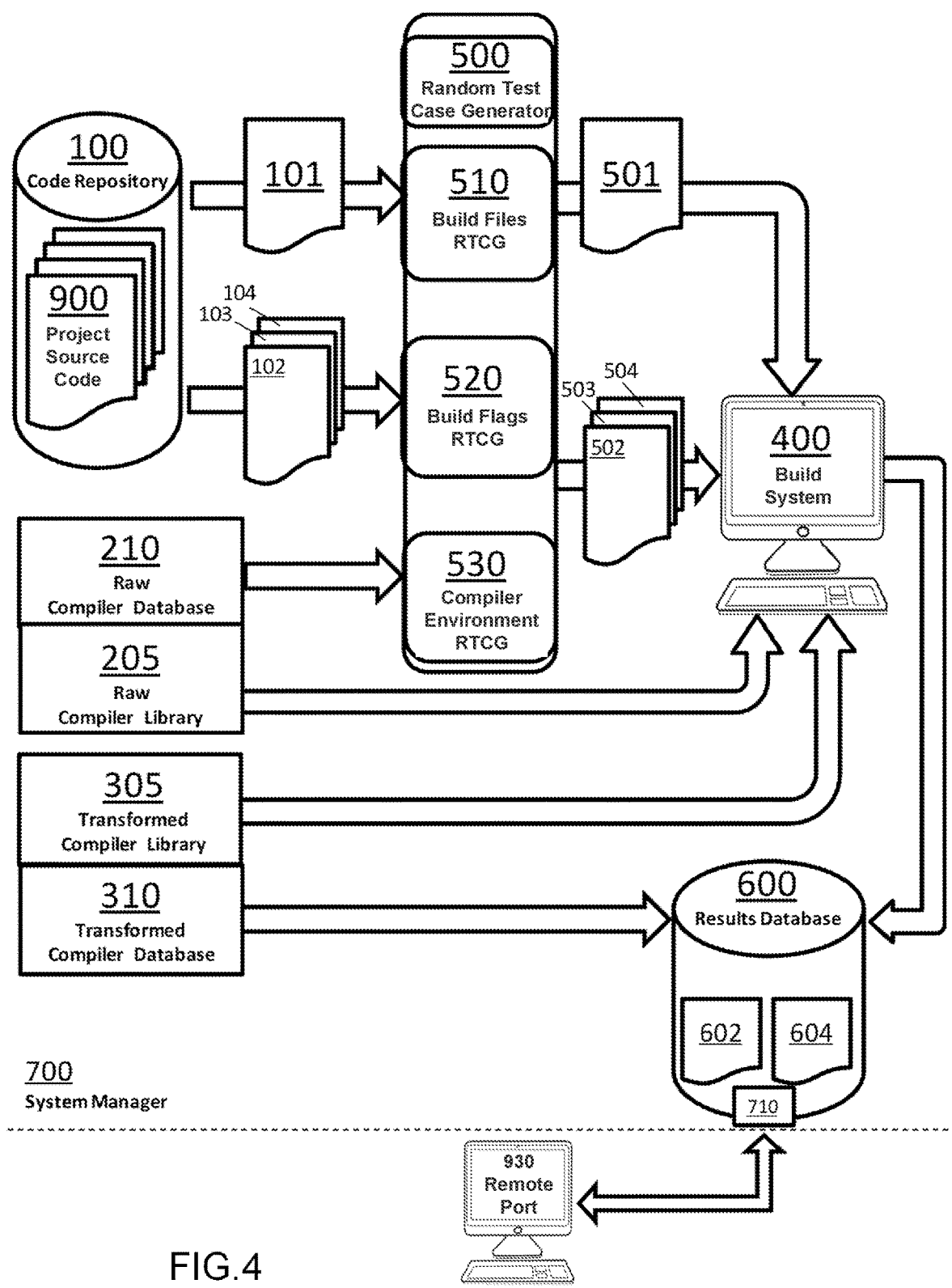
FIG. 4 shows an example of a build system utilizing a raw compiler and a transformed compiler.

FIG. 4 shows an example of a build system utilizing a raw compiler and a transformed compiler. The code repository 100 may comprise a singular or multiple project source files 900 provided by the user or systematically chosen pulled from a larger open-source repository. The source repository may be a curated collection of project source files 900 related to a specific industry of interest or sharing a common element (such as operating system or processor) which can be used to test complier behavior.

FIG. 4 also shows components included in the random test case generator (RTCG) 500. For example, RTCG 500 includes Build File RTCG 510, build flag RTCG 520, and compiler environment RTCG 530. Within the random test case generator (RTCG) 500, the project source code 101 may be modified by the Build File RTCG 510, proper compiler instructions 102 may be changed by the build flag RTCG 520, and variables/parameters of the compiler environment RTCG 530 can be altered. In some implementations, the raw compiler, unmodified project source code 101, and proper compiler instructions 102 can be compiled multiple times by the build system 400 along with illegally injected code from the RTCG 500 to establish a performance baseline and identify possible build-time differences or artifacts created by the raw compiler. Further, in some implementations, it may also be advantageous to run multiple passes with the transformed compiler. Multiple passes allow for statistical evaluation of performance metrics, such as establishing the average and standard of deviation of compile times, which may add confidence to the value.

In addition, multiple passes of the raw compiler and/or transformed compiler using identical project source code and build parameters as input allow the results database 600 to identify dynamic build-time artifacts and generate an autogenerated compiler bitmask that can be used to selectively ignore build-time artifacts (a/k/a build-specific metadata that are created during a build process) for deciding "near-equivalence" in performance of the raw compiler and the transformed compiler.

Figure 5:
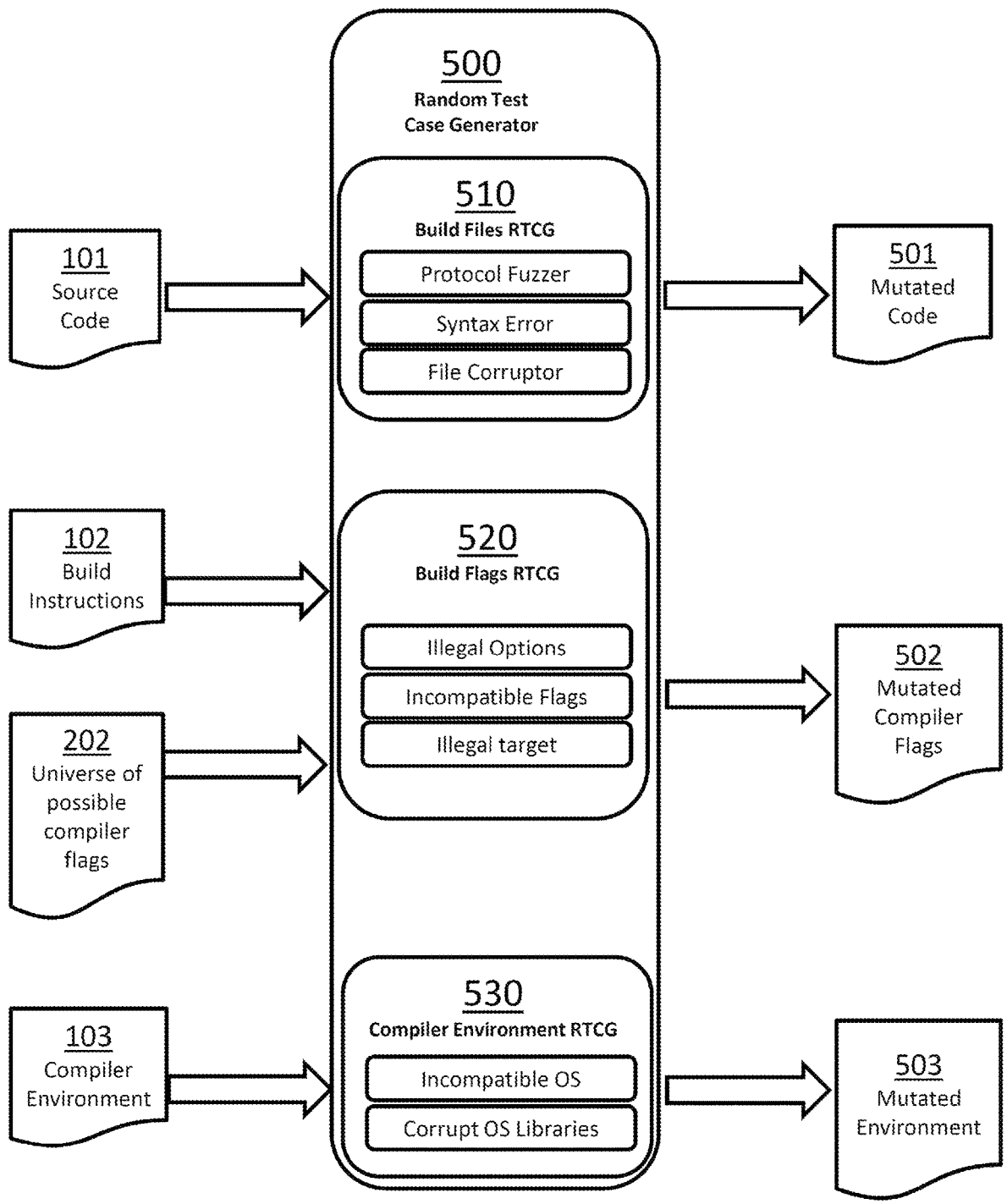
FIG. 5 shows an example of a random test case generator (RTCG).

FIG. 5 shows an example of a random test case generator (RTCG). For example, RTCG 500 includes Build File RTCG 510, build flag RTCG 520, and compiler environment RTCG 530. Prior to passing the test inputs, including the project source code 101, proper compiler instructions 102, and compiler environment or platform characterization 103, into a (e.g., the build system 400 in FIG. 4), the test inputs pass through a random test case generator block or RTCG 500. The RTCG 500 may alter the project source code 101, proper compiler instructions 102, and compiler environment or platform characterization 103. In some implementations, the RTCG 500 expands test coverage of the compiler selected from either the raw compiler library 205 or transformed compiler library 305 by introducing additional random test cases from the "universe" of test cases. A properly-functioning compiler can spot numerous errors in the input files and compiler flags and accordingly generate warnings and error messages. Further, a compiler can make sure/validate that the input files are legal and conforming source code. In addition, a compiler can perform error checking to make sure that the compiler flags used in compilation aren't in conflict.

As shown in FIG. 5, build file RTCG 510 takes source code 101 as input to generate mutated source code 501. A build flag RTCG 520 within the random test case generator 500 receives input from both the proper compiler instructions 102 and the universe of possible compiler flags 222 (e.g., relative to the raw compiler under test) to generate potentially illegal, unintended, or benign combinations of mutated build flags 502. Examples of illegal combinations of mutated build flags 502 may include specifying compiling a 32-bit output to operate on a target 16-bit embedded processor. Compiler environment RTCG 530 takes compiler environment 103 as input to generate mutated environment 503. In some embodiments, mutated code 502 includes illegal code structures that are injected into the source code 102. Examples of illegal source code injected can be unrecognizable input, corrupted files, illegal use of reserved words and structures, and non-textual elements (such as the extended character set). Mutated compiler flags 502 can include illegal compiler flag structures injected into the universe of possible (i.e., accurate or proper) compiler flags 202. Examples of possible compiler flags 202 can include mistyping flags (such as inserting three or more dashes when the flag is used), using incompatible flags that do not exist in the a (raw or transformed) compiler's dictionary, or missing files from flags that require a file input. In some implementations, files needed for compilation are deliberately removed so that certain files are missing. In some implementations, a protocol fuzzer in build files RTCG 510 can generate illegal combinations of mutated code 501 and mutated compiler flags 502. Examples of illegal combinations of mutated code 501 and mutated compiler flags 502 include corrupted source files (e.g. computer crashed while saving file), unrecognizable input (e.g. a non-ASCII character existing in the file), wrong reserved words or structures (e.g. the reserved word "continue" used as a function name), or non-textual elements (e.g., a jpeg image is used as input into the compiler). The purpose of the fuzzer is to create permutations of compilers, build instructions, and flags.

The RTCG 500 may also access the raw compiler matrix which includes the intended operating system for the raw compiler 230. The compiler environment RTCG 530 may instruct the ACME manager to load a non-intended operating system for compiling the project source code. Alternatively, the compiler environment RTCG 530 may corrupt libraries or change states of the build system 400 operating system. Either case may create an unstable system which causes the selected compiler to crash or produce erroneous results. Because one goal of the ACME is proving near equivalence in performance between the raw compiler and transformed compiler, any behavioral difference due to a mutated environment 503 is considered as valid. Thus, it will be appreciated that the disclosed RTCG 500 system generally allows automatic modifications of input files, source code, variables, and parameters in random and unanticipated ways.

In some implementations, the RTCG 500 may leave the project source code 101, build instructions 102, universe of possible compiler flags 202, and compiler environment 103 unmodified, e.g., to ensure that the project source code 101 is successfully compiling under developer-intended conditions.

Figure 6:
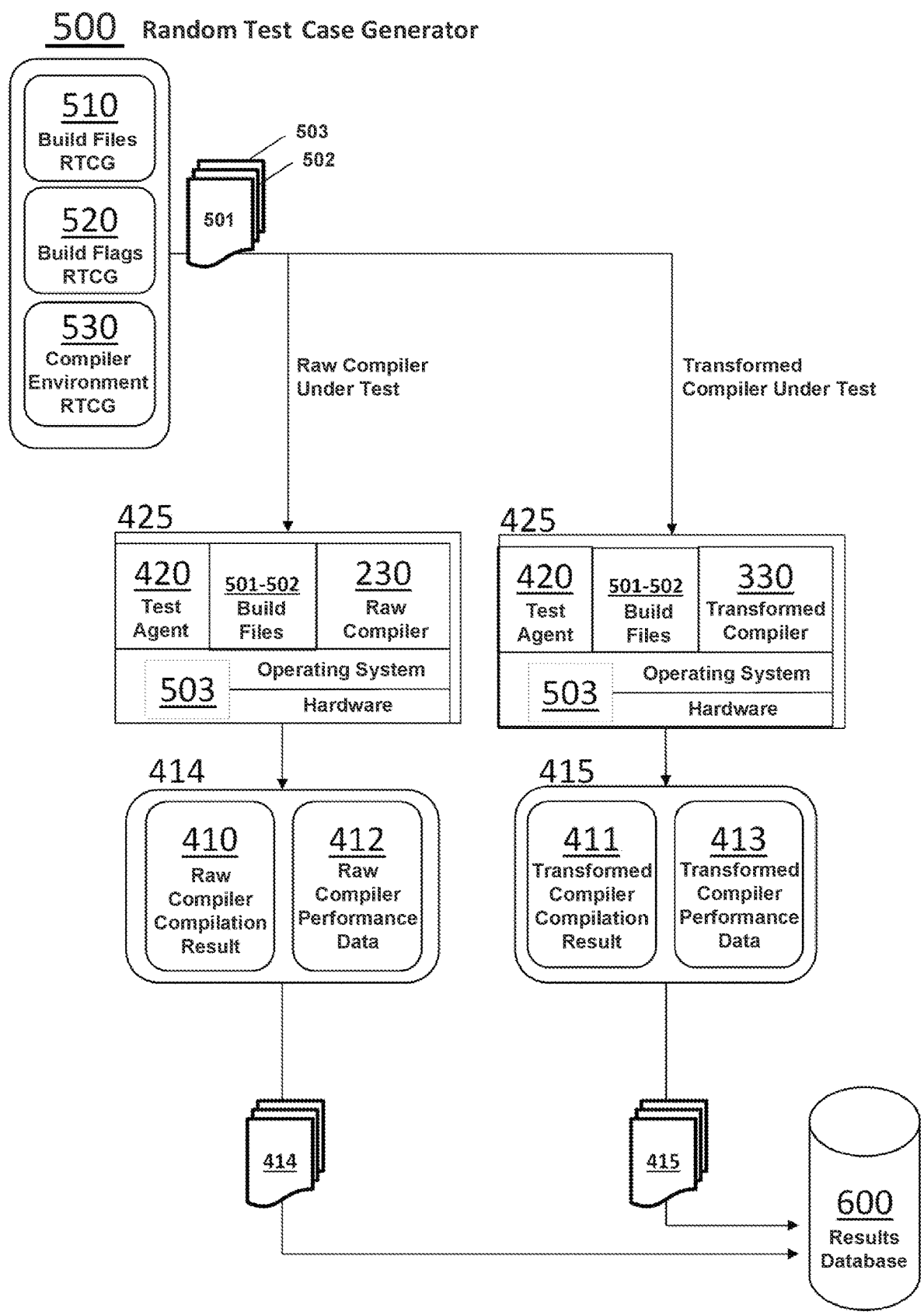
FIG. 6 shows a block diagram illustrating generation of test results and performance data by a raw compiler and a transformed compiler.

FIG. 6 shows a block diagram illustrating generation of test results and performance data by a raw compiler and a transformed compiler. The build system (e.g., the build system 400 in FIG. 4) block takes in the mutated source code 501, mutated build flags 502, platform characterization 503, project metadata 504, and designated compiler (either a raw compiler or a transformed compiler), and performs the compile operation using one or more processors. During the compile operation, all standard outputs, such as warnings, messages, and errors, are logged, as well as performance metrics, such as the amount of time required to complete the compile operation. Other possible outcomes which are logged may include cases when the designated compiler has crashed. If the compile operation is successful, then an output file including executable machine code can also be logged. In some cases, depending on the make process, there may be multiple executable machine code or executable (.exe) files. These outputs, performance metrics, and resulting machine code are collectively passed as the compiled results into the results database 600.

The results database 600 organizes and provides analysis of the compiled results. The results database may include test metadata relating to the inputs and outputs of the build system. Examples of test meta data include a date/time of test, a project ID, random error input such as mutated code and mutated compiler flags, information about the raw compiler, and information about the transformed compiler. The analysis of the test data results in results database 600 may determine pass/fail criteria based on one or more (predefined) conditions. It will be appreciated that the goal of the ACME is not necessarily limited to compile in all cases, but rather to assess that the results of the transformed compiler are "nearly-identical" or "nearly-equivalent" to the results of the raw compiler for a given set of inputs (e.g., project source files, associated file data, and compiler options). As tests continue to run through the engine, the ongoing results are recorded into a results log file 604.

The build system is controlled by the ACME manager (e.g., the ACME manager 700) and receives information with regards to the build environment. The build system also receives (from the ACME manager) elements necessary to perform the build from the random test case generator block. Information which resides in the code repository 100, raw compiler database 210, transformed compiler database 310, or other places within the system may be passed from the ACME manager to the build system. This includes test metadata such as the build date and time of test, a project identifier, identifiers of the raw compiler 230 and transformed compiler 330, and a summary of test conditions and manipulations injected by the random test case generator 500. In some implementations, the ACME manager can capture run-time errors.

As shown in FIG. 6, the build system also includes a test automation agent 420, such as Jenkins, that communicates to the ACME manager and receives the test instructions, reports stats, collects results, and communicates with the rest of the system. The test automation agent 420 also performs test setup, such as loading the proper compilers to align with the given test.

FIG. 6 also illustrates how the build system may perform two similar operations depending whether testing the raw compiler 230 or the transformed compiler 330. Because of the similarities between the operations, the specification may generalize a term, such as compiler compilation results and reference 410/411 to represent the raw compiler compilation result 410 and the transformed compiler compilation results 411 (generally referred to herein as raw compiler test results data and the transformed compiler test results data).

The build system may have a dedicated operating system, operating system shell, a virtual machine, or operating system emulator on which the compiler under test will operate. Test infrastructure 425 is the physical computer that hosts the test. The disclosed methods can be tested. The physical test infrastructure can be selected based on the processor requirements for the given compiler. Physical test infrastructure options can exist for each processor architecture where transforms can be applied. Examples include standard PCs and servers for x86_32, x86_64 architecture, RasberryPi for ARM architecture, and SPC58EC-DISP Development Board for PowerPC architecture.

As an example, a computer may be running the ACME manager on a windows operating system. Depending on the test infrastructure 425, the computer may open VirtualBox, an open source virtual machine software platform by Oracle. Within the virtual machine the test manager may then load Ubuntu 17.10, a Linux based operating system, in order to test either Gnu C Compiler gcc or the Gnu C++ compiler g++ in the intended compiler's native operating system. Furthermore, based on operating system requirements from the random test case generator, modifications may be made to the operating system working within the virtual machine without corrupting the computer's primary operating system.

As an alternative to the virtual machine, an actual host computer under the command of the ACME manager may act as the physical test infrastructure. The physical test infrastructure can be selected based on the processor requirements for the given compiler. Physical test infrastructure options exist for each processor architecture where transforms can be applied. Examples of a physical test infrastructure related to the processor architecture are shown in the Table 1.

TABLE 1

| Physical Test Infrastructure | Processor Architecture |
| --- | --- |
| PCs and Servers | x86_32, x86_64 |
| Raspberry Pi development board | ARM |
| Creator CI20 dev board | MIPS |
| SPC58EC-DISP Development Board | PowerPC |

The central component within the build system is the selected compiler from the either the raw compiler library 205 or transformed compiler library 305, which becomes the compiler-under-test. The operating system and hardware 103 are loaded onto the test infrastructure 425, the test automation agent 420 receiving the command to execute the test, the operating system is loaded into the hardware, the compiler-under-test is loaded from the appropriate compiler library along with pre-configured test input which includes the Build Files which include the mutated source code 501 and the mutated build flags 502 from the random test case generator. Continuing the example above, a transformed gcc compiler, such as gcc1, may be executed from the Linux command line within the virtual machine along with the source code derived from Hello_World.c and associated build flags. The manipulated build instruction 502 from the random test case generator 500 may comprise a subset taken from the entire universe of build flags associated with the raw compiler.

Concurrent to the execution of the compiler-under-test, the test automation assistant 420 establishes a build log file (414/415) and begins recording compiler performance data (412/413) and compiler compilation results (410/411) relevant to the current compiler-under-test. If compilation was successful, the compiler compilation results (410/411) will include all compiled binaries. If compilation wasn't successful, the compiler compilation results (410/411) includes the compiler output (such as STDERR and STDOUT). If the compiler-under-test crashed, the compiler compilation results (410/411) includes a compiler core dump, relevant state information about the process when it crashed, and compiler output STDOUT and STDERR.

Compiler-under-test performance data, such as memory utilization, processor utilization, compilation time to compile, are computed and captured in the compiler performance data (412/413). Compile time is computed from the execution of the compile command until the successful or unsuccessful termination of the compile process. The entirety of the build log file (414/415) is transferred from the build system block to the results database 600.

Figure 7A:
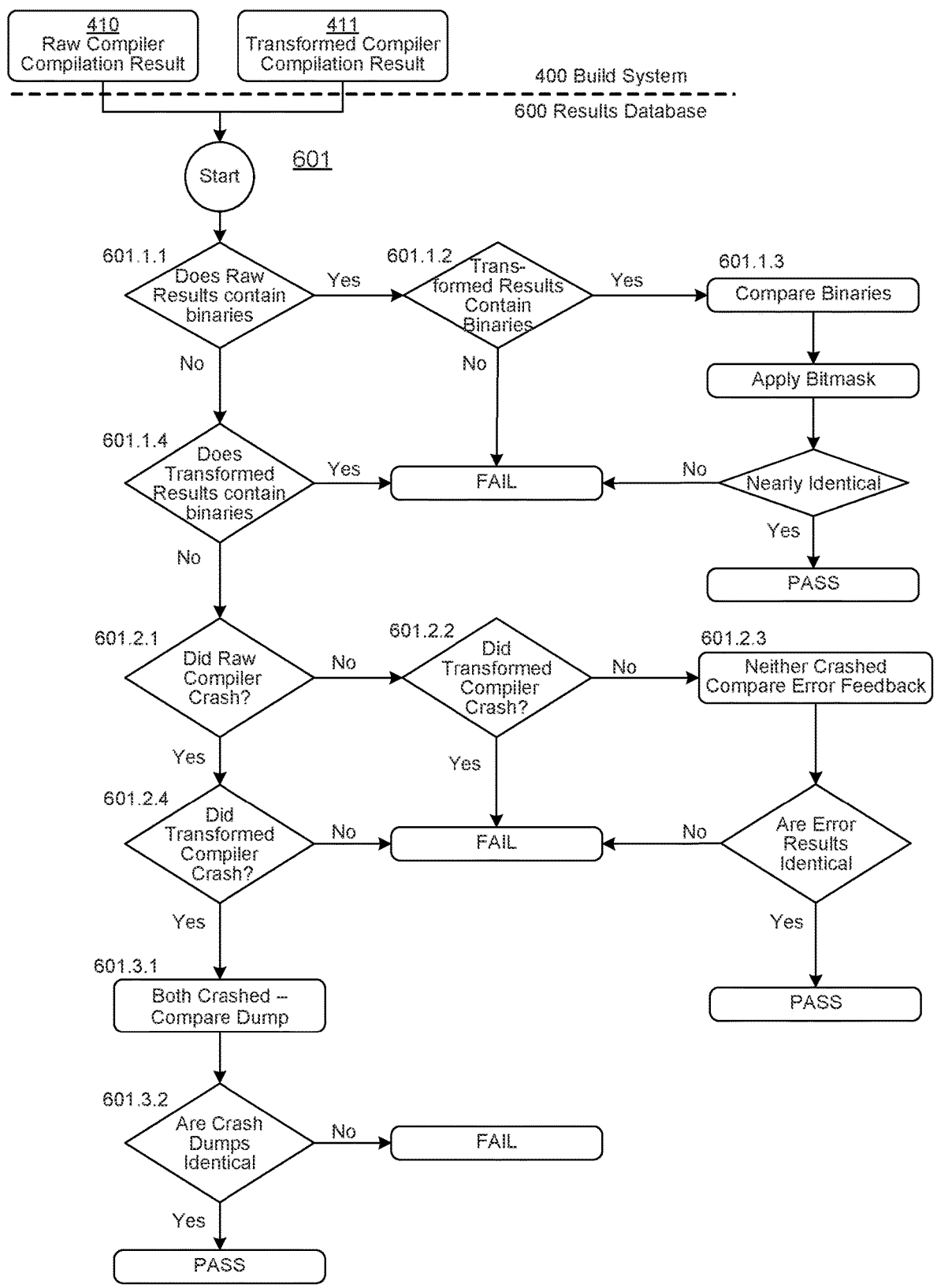
FIG. 7A shows a flowchart of an example method to analyze the pass/fail criterion of results generated by a raw compiler and a transformed compiler.

FIG. 7A shows a flowchart of an example method to analyze the pass/fail criterion of results generated by a raw compiler and a transformed compiler. A pass/fail decision tree, which is illustrated as FIG. 7A, resides within the results database 600 and is employed to evaluate results from the compiler compilation result (410/411) and render a "pass" or "fail" judgement based on the criteria of near equivalence between the output of the raw compiler compilation result 410 and the transformed compiler compilation result 411 to identical inputs. The result of the pass/fail decision tree captures whether the raw compiler and transformed compiler 330 behaved identically, accounting for scenarios where the compilation completed, errored-out, or crashed. A PASS result means that the transformed compiler 330, for that test scenario, created functionally equivalent output to the raw compiler, thus supporting a judgement of transformation inertness. A FAIL result means that something about the resulting behavior was different and the transformed compiler 330 exhibited unintended behavior.

Details flow of the pass/fail decision tree shown in FIG. 7A are as follows:

| Ref. Numeral | Detailed Function |
| --- | --- |
| 601.1.1 | Does the raw compiler test results data include a compiled binary or binaries? If yes, proceed to 601.1.2. If no, proceed to 601.1.4. |
| 601.1.2 | Did the transformed compiler test results data include a compiled binary or binaries? If yes, proceed to 601.1.3. If no, the test result (602) is a FAIL. |
| 601.1.3 | Both compilers successfully compiled. If compilation was successful, this can include all compiled binaries. The binaries will be compared. Are the binaries stored in the raw compiler test result data and the transformed compiler test results data identical? In this case, "identical" means that the comparison will ignore any bits in the project specific compiler bitmask, the predefined compiler bitmask or the autogenerated bitmask. If all of the bits included in both the binaries (ignoring the aforementioned bitmasks) are identical, the test result (602) is a PASS. If there are any differences in the bits of any binaries, (ignoring the aforementioned bitmasks) then the test result (602) is a FAIL. |
| 601.1.4 | Did the transformed compiler compilation test results data include a compiled binary or binaries? If yes, the test result (602) is a FAIL. If no, proceed to 601.2.1.<br>At this point, the system has determined that both the raw compiler and the transformed compiler failed to compile the binaries. The next step will be to determine if the reasons for failed compilation are the same. |
| 601.2.1 | Did the raw compiler crash (e.g. segmentation fault)? If no, proceed to 602.2. If yes, proceed to 601.2.4. |
| 601.2.2 | Did the transformed compiler crash? If no, proceed to 601.2.3. If yes, the test result (602) is a FAIL. |
| 601.2.3 | Neither compiler crashed. The error feedback stored in the compiler compilation results from the two compilers will be compared. Is the error state for the raw compiler identical to the error state for the transformed compiler? If yes, this test result (602) is a PASS. If no, this test result (602) is a FAIL. |
| 601.2.4 | Did the transformed compiler crash? If yes, proceed to 601.3.1. If no, the test result (602) is a FAIL.<br>At this point, the system has determined that both compilers crashed. While production compilers shouldn't crash, it definitely happens. At this point, the system will determine if the crashes are identical. |
| 601.3.1 | Compare the crash dumps stored in the raw compiler test results data and the transformed compiler test results data. |
| 601.3.2 | Are the two crash dumps identical? If yes, the test result (602) is a PASS. If no, the test result (602) is a FAIL. |

Figure 7B:
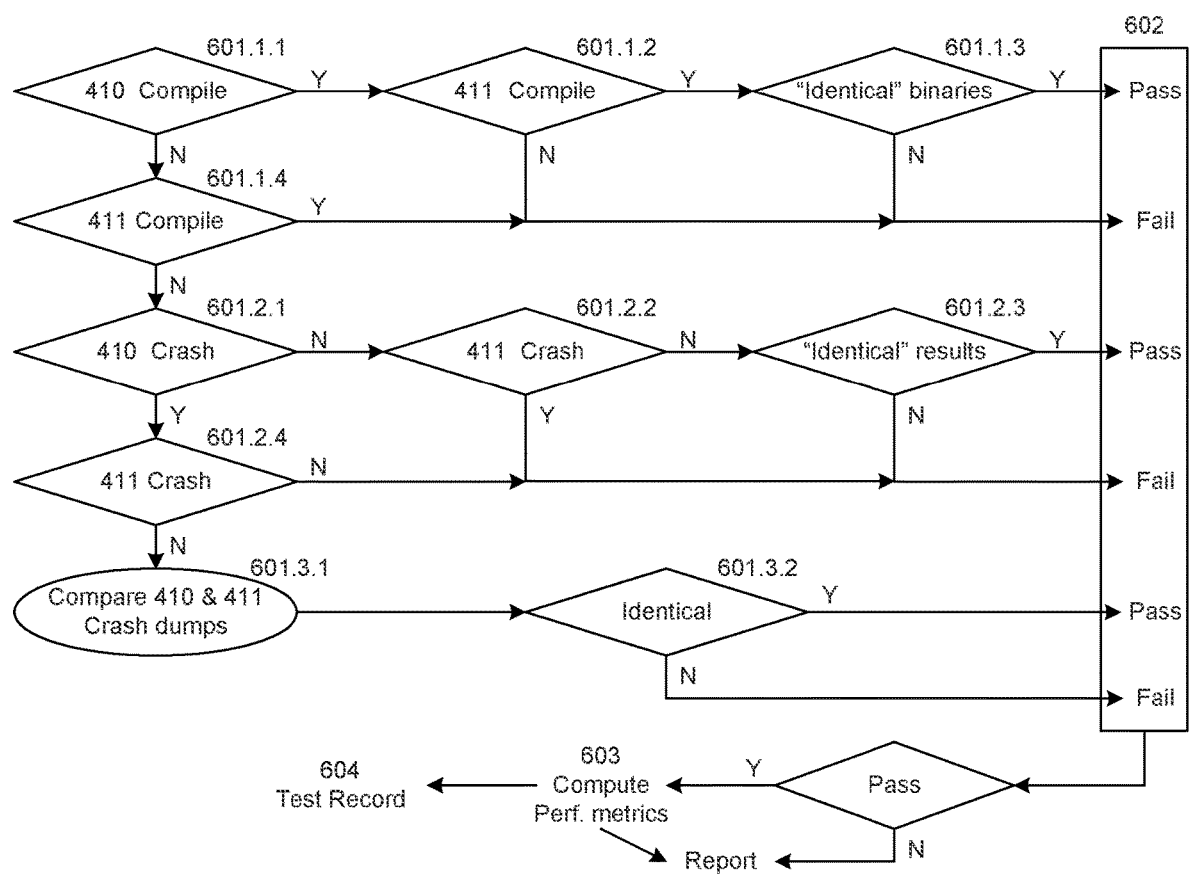
FIG. 7B shows an example decision matrix based on the flowchart of FIG. 7A.

FIG. 7B shows an example decision matrix based on the flowchart of FIG. 7A. Examples of various elements of decision matrix 601 (e.g., stored in results database 600) are outlined below.

| | |
| --- | --- |
| 602 | Pass/Fail Result - This result captures whether the raw and transformed compilers behaved identically, accounting for scenarios where the compilation completed, errored-out, or crashed. A PASS result means that the transformed compiler, for that test scenario, behaved identically to the raw compiler, supporting a judgement of Transformation Inertness. A FAIL result means that something about the behavior was different and the transformed compiler introduced new, unintended behavior. |

| | |
|---|---|
| 604 | Test result report - The test report can pull together key data and is sent back to the test manager. If the test result was a FAIL, the report can include enough data to help the system owner try to identify what went wrong and where. This may include the specific compilation artifacts that were different between the two compilers. For example, the artifacts include showing the location in the software at which failure occurs (specific error codes may be shown indicating why it failed), details such a time of failure, whether the raw compiler, transformed compiler, or both failed, and whether a combination of the compiler and the source code was the cause for the error. If the test result was a PASS, only summary data of the test may be necessary for the report. |
| 605 | Permanent test record - The permanent test record keeps record of what test results for each platform characterization 103. If a test case has a passing result, it does not need to be tested again, unless there has been an update to that test case. |
| 603 | Compute performance metrics - Using the performance data collected by the test automation agent (e.g., test agent 420), the system can create metrics to characterize any impact the transformation process had on the transformed compiler. Reasons for difference in performance metrics include added instructions during transformation, different logic to produce the same result, etc. |

The results database 600 evaluates the effects of the key performance metrics. Using the raw compiler performance data 412 and the transformed compiler performance data 413 collected by the test automation agent 420, the results database will assess the performance data to characterize any impact the selected transformation process had on the transformed compiler 330. Possible causes for difference in performance metrics include instructions added during transformation, different logic to produce the same result, or transformation of compiler blocks which effect the project source code memory usage. It should be noted that the difference in the performance between the raw compiler and the transformed compiler 330 may have either a desirable, neutral, or an undesirable outcome.

The compilation results (410/411) and compiler performance data (412/413) are recorded into a test report which pull together key data and is sent back to the ACME manager 700. If the result of the pass/fail decision tree was a PASS, only summary data of the test and compiler performance data (412/413) will be necessary for the report. If the result of the pass/fail decision tree was a FAIL, the report will include enough data to help the system owner try to identify what went wrong and where.

As an example of a report wherein the result was a FAIL, the report would include the specific compilation artifacts that were different between the two compilers, show the location at which will fail (specific error codes will be necessary to show why it failed), the time of fail, and the input test conditions. The input test conditions include the raw compiler id, transformed compiler id, operating system, project source code, and modifications created by the random test case generator.

Alternatively, the test results 602 may be simultaneously recorded into two records, one record can be the developer debug information record 604, and the other can be the permanent test record 606 including a more concise summary of the transformation performance. Either record may be stored locally or remotely located. The contents of the records 602/604 may be reviewed by the system user through a remote port 930 at any time, including while the ACME is performing tests. The permanent test record 604 may include limited information relative to the detailed test report 602, which is intended to provide debug level information for the BTS developer. As an example, the permanent test record 604 may be reduced in file size by eliminating the resulting binary files or system crash dump logs.

The build process for a given project might include adding in build-time artifacts, such as the build time. This would mean that, for repeated builds and/or compilations of the same project, two binaries would not be identical. Often these build artifacts are constrained to a location in the header portion of the binary file. A project-specific bitmask can ignore these artifacts for performing comparisons (e.g., step 601.1.3 in FIGS. 7A and 7B) because the difference in the binaries (e.g., based on different build times) do not necessarily suggest a failure of compilation. An example of this is with Python. Compiling Python generates a timestamp in the rodata section of binary (specific address depends on compiler flags). As a result, the ELF Build Ids and the addresses where the timestamp is located can be ignored. In some embodiments, the ACME can track the bits over time to validate that the build-time artifacts are changing over time.

FIG. 8 shows an example of a raw compiler database. A raw compiler database 210, which is available to the ACME manager, includes a compiler matrix storing information about the various raw compiler(s) within the raw compiler library. (The raw compiler library includes the complete raw image of a compiler or multiple compilers.) The compiler matrix illustrated in FIG. 8 includes the compiler name 212, target instruction set architecture 218, compiler version information 214, baseline operating environment or operating system 216, executables it needs to run, and the universe of possible compiler flags 222. If the compiler was provided as a source file, rather than a binary file, the raw compiler library 205 also includes a pointer to the compiler source project ID 235. The compiler matrix also includes information regarding predefined compiler bitmasks 226 which may be ignored in order to evaluate near-equivalent results. The universe of possible compiler flags 222 includes all of the possible flags for a given compiler. The universe of possible compiler flags 222 can also be used in the random error generator 500 to determine what should pass and what should fail as the result of an illegal command. The docker container ID 224 is the name of the virtual machine running the specific operating system, architecture, and compiler. The compiler source ID 235 is the name in the code repository 100 that describes a specific compiler and its version. Because the compilers are open source, each compiler's source files are hosted on the code repository 100.

A compiler, in its binary form, is typically intended to work with a specific operating system (e.g. Windows, Ubuntu, Linux, etc). The ACME manager 700 will be able to reference the compiler matrix from the raw compiler database 210 to confirm when it is choosing a compiler to test that the compiler is loaded into the operating system for which it was designed. Also, a compiler may have compiler version information 214 which includes what languages it is designed to compile, what target instruction set architecture 218 it is designed for, any nuances with the specific compiler version.

For a given compiler, the compiler executables could be one, monolithic binary or a binary with supporting libraries and the test validity performs the binary transformation on the compiler in its entirety. To aid the ACME manager 700 in ensuring this is carried out, information on the compiler executables and file organization is stored within the compiler matrix. Likewise, a compiler will have many different command-line flags that alter decisions made by the compiler about the compilation process and the compiler matrix includes the entire universe of possible command line flags and inputs 222. A compiler will have many different command-line flags that alter decisions made by the compiler about the compilation process. Some of the flags can be -c, -S, -E, -o, --help, -Wall, -Werror, or -wrapper.

The ACME manager 700 determines which image of each raw compiler in the raw compiler library 205 will be subject to binary transformation by the binary transformation system 800. To aid in the decision, the ACME manager 700 utilizes the compiler matrix from the raw compiler database 210. Alternatively, the user may preselect raw compilers 230 which are of interest from a subset of the existing raw compilers in the raw compiler library 205. Various transformations methods may be applied to a raw compiler 230 to create a plurality of transformed compiler 330. There are multiple methods of transformations that could be applied to the raw compiler 230 such as block-level binary randomization (BBR), stack frame randomization (SFR), and code flow integrity (CFI). In addition, these methods may be combined to further transform the raw compiler 230, such as applying CFI and BBR.

FIG. 9 shows an example of a transformed compiler database. A transformed compiler database 310 for the transformed compiler(s) is maintained by the ACME manager. The transformed compiler database 310 includes a pointer or identifier for the raw compiler or raw compiler GUID 312 to which the BTS was applied, raw compiler name 314, and the transformation metadata. The transformation metadata may include, information and parameters regarding the specific transforms applied and version of the raw compiler, a date when the raw compiler was transformed, and docker file information.

The ACME manager carries forward the system test inputs which include project source files from the code repository, and universe of possible compiler flags 222 from the raw compiler database, and selects a corresponding compiler from either the raw compiler library or transformed compiler library.

Figure 10:
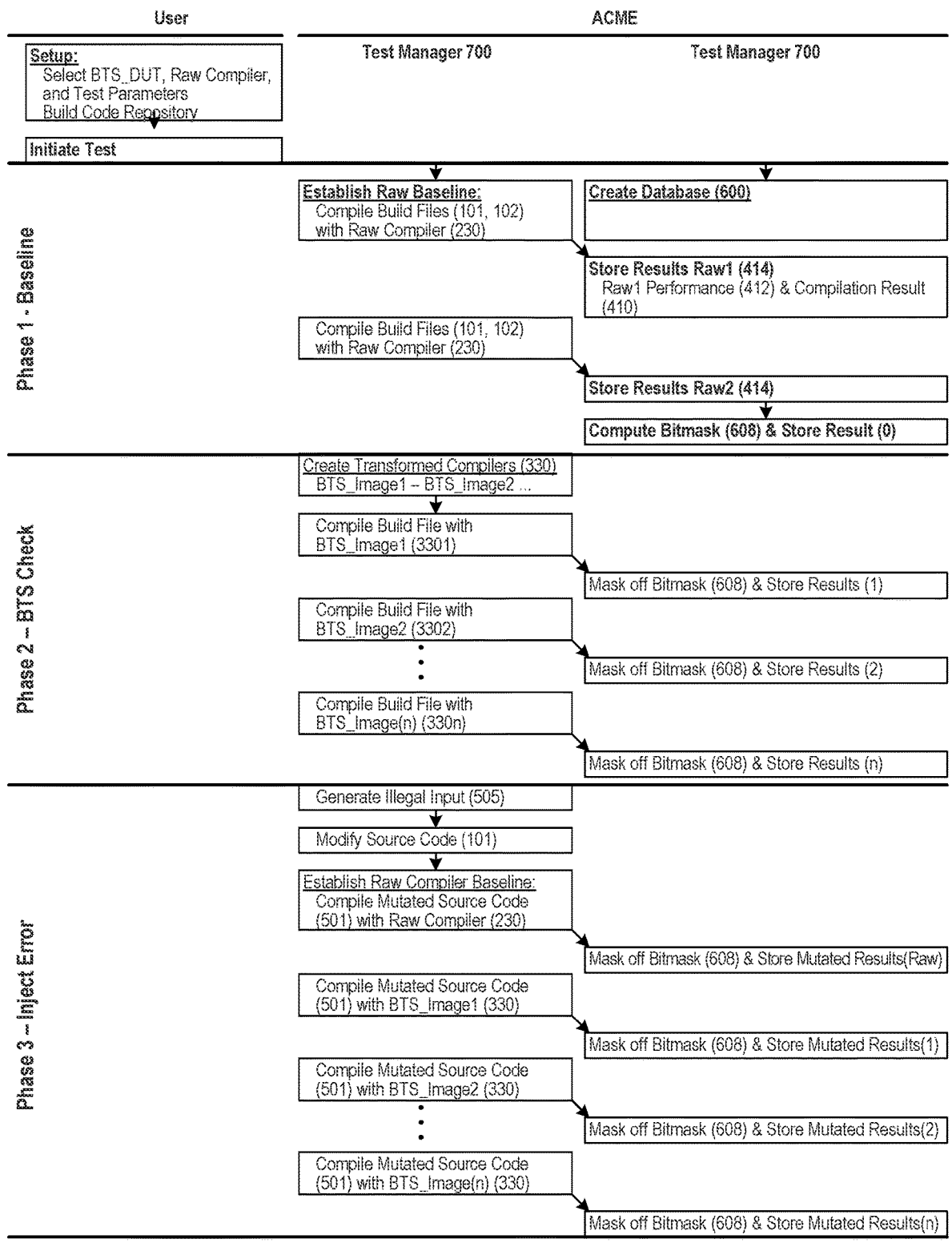
FIG. 10 shows an example of interactions between a user and the disclosed ACME.

FIG. 10 shows an example of interactions between a user and the disclosed ACME. For example, FIG. 10 shows the steps performed to generate and apply an autogenerated compiler bitmask. In phase 1, the raw compiler 230 is run twice and the raw compiler compilation results 410 are stored as machine code Raw1.exe and Raw2.exe. These two files are then compared, differences identified, and the differences become the autogenerated compiler bitmask 608. The raw compiler compilation results 410 are stored in a database. In phase 2, the raw compiler 230 is transformed utilizing different binary transformation systems to create BTS_Image1 and BTS_Image2. The project source code is compiled using BTS_Image1, and the transformed compiler compilation results 411 are stored. In phase 3, errors or illegal input are injected into the source code 101 for generating performance and compilation results. The process begins by generating illegal input 505. An essentially limitless number of alterations in the form of illegal input 505 can be applied to the source code 101. One examples of generating illegal input 505 includes the insertion or deletion of random characters or symbols. Another example may include altering the size or type of a variable defined within the source code 101. After the illegal input 505 is applied to the source code 101, the result is a mutated source code 501. In some embodiment, the illegal input 505 or the mutated source code 501 may be stored with the results database 600.

Using the mutated source code 501, a new baseline of performance 412 and compilation results 410 of the raw compiler 230 are established. Given the limitless variety of illegal input 505, it is within the realm of possibilities that the mutated source code 501 may successfully compile without warning. Alternatively, it is possible that the compilation of the mutated source code 501 will be unsuccessful, generate warnings, or even cause the compiler to abruptly terminate.

In one embodiment, the bitmask 608 computed in phase 1 may continue to be utilized as a bitmask 608. In another embodiment, the bitmask 608 may be recomputed utilizing the method described in phase 1, but in response to the new mutated source code 501. Following the compilation of the mutated source code 501 with the raw compiler 230, the bitmask 608 is applied, and the raw compiler compilation result 410 for the mutated source code 501 is stored for comparison. Subsequently, the mutated source code 501 is compiled using the various BTS images 330, the bitmask 608 applied, and the resulting transformed compiler compilation results 411 for the mutated source code 501 are stored for comparison.

FIG. 11 shows an example of a project-specific bitmask. Artifact 810 is the command, on a machine running ubuntu, to display the information held in the notes section of the hello1 executable. Artifact 811 is the output of 810's command, and it prints out information about hello1 including its build ID. Artifact 812 is a command to compare hello1 and hello2. The significance of these binaries is that they were both created by hello-world.py and they produce the exact same output. Artifacts 813 and 814 combined are the output of 812, which shows every difference between the two binaries. The second column of the output can be matched to the build ID in 811 when read top to bottom. Artifact 813 shows that despite the two binaries being identical in output, they have different build IDs. Artifact 814 is showing that much further in the file there is another block of 3 bytes that differ between the two binaries that makes up the dynamic build-time stamp. Together, 813 and 814 show that there is data in the binary that is not critical to its execution, and is therefore functionally inert. In some embodiments, in place of that data, other markers of a transformation or build time information can be inserted, such as a compiler version or project build ID. This can be achieved by bit masking the non-critical components of the binary by performing an and operation with all zeroes. Once the inert data is zeroed out, an or operation can be performed to insert the transformation marker.

FIG. 11 illustrates an example of dynamic build-time artifacts displayed on a terminal operating Linux. Two machine code executable files, hello1 and hello2, have been created from a python script hello_world.py, utilizing the compile command in the raw python interpreter and a transformed python interpreter respectively. Python places build-time artifacts known as the executable and linkable format (ELF) into the machine code which include a unique build ID bitstring for each compile. The command line identified as 810 instructs the system to access and display this information from the machine code hello1. The terminal response is indicated as 811 and displays the dynamic build-time artifact, ELF owner, data size, and description—in the description, we see that a unique build ID bitstring follows the NT_GNU_BUILD_ID. The data for the build ID is follows and begins with 56. The command line identified as 812 requests the computer to compare the machine code hello1.exe and hello2.exe and display the differences including the address, byte from hello1, and byte from hello2. The response from the computer, indicated as 813, shows a listing of difference which includes at address 0x284, the byte 56 in hello1 and the byte 6C in hello2 (which is the first character of the BUILD_ID for hellow2). Also shown in the comparison are differences at addresses 0x2229F3-0x2229F6, which can be identified as a dynamic build-time time stamp. In this case, the results database 600 creates an autogenerated bitmask which ignores addresses 0x284-0x296 and 0x2229F3-0x2229F6 when performing a comparison for equivalence. In an alternative embodiment, the predefined compiler bitmask 226 for a specific compiler may be known and made available to the system.

FIG. 12 shows an example of a compiler bitmask. Artifact 815 shows a hexadecimal dump at addresses 0x002229ef-0x002229ff. On the right hand side, the date and time is shown. Since every compilation time will be different and these bytes will always remain in the same part of the binary, it is possible to mask these bytes.

Figure 13:
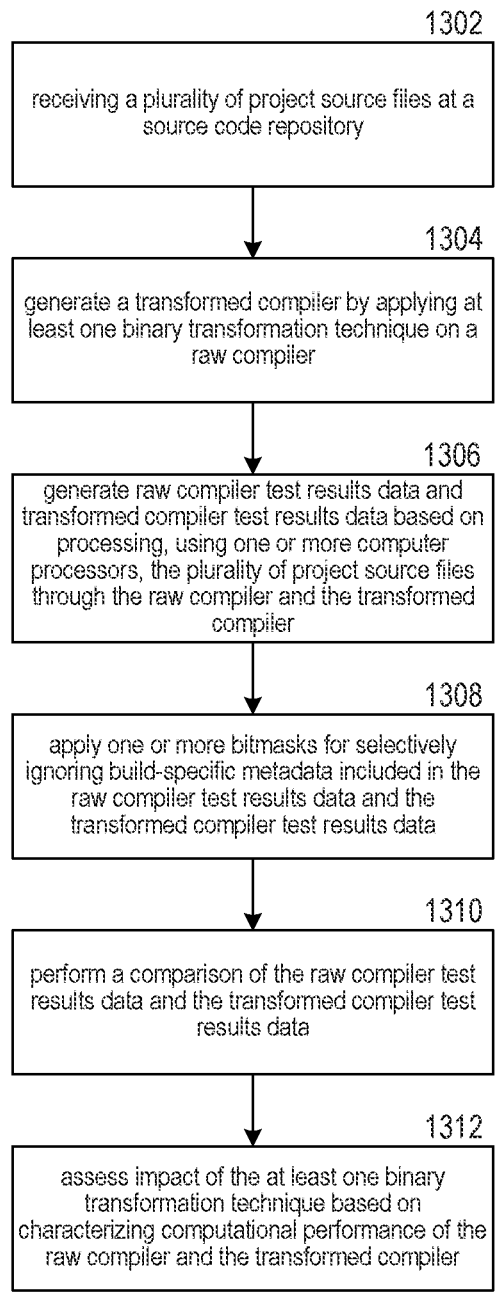
FIG. 13 shows an example flowchart of a method for testing the effectiveness of a binary transformation technique.

FIG. 13 shows an example flowchart of a method for testing the effectives of a binary transformation technique. At step 1302, the process receives a plurality of project source files at a source code repository. At step 1304, the process generates a transformed compiler by applying at least one binary transformation technique (e.g., CFI, BBR, SFR) on a raw compiler. At step 1306, the process generates raw compiler test results data and transformed compiler test results data based on processing, using one or more computer processors, the plurality of project source files through the raw compiler and the transformed compiler. At step 1308, the process applies one or more bitmasks configured for selectively ignoring build-specific metadata included in the raw compiler test results data and the transformed compiler test results data. One example of a bitmask is a project-specific bitmask that can mask/selectively ignore build-specific metadata between two practically identical binaries but have small differences (such as the build ID and dynamic build timestamp) attributed to build-time artifacts. For example, the disclosed ACME performs a comparison ("diff") between a binary generated from compilation on the raw compiler and a binary generated from compilation on the transformed compiler, and upon determining that the binary generated from compilation on the raw compiler is functionally equal (e.g., do the same or similar thing) to the binary generated from compilation on the transformed compiler, the comparison can be used to compute a project-specific bitmask, thereby making it specific or particularly applicable to the project source file(s). Another example of a bitmask is a compiler bitmask that can be universally applicable to other project source files (e.g., ideally all project source files). In some implementations, the disclosed ACME computes a compiler bitmask based on determining a location of a build-time artifact (e.g., a time stamp or a version number included in a data file that is used in compiling the project source file(s)). After the location of the build-time artifact (e.g., the time stamp) is determined, the ACME masks the time stamp or the version number for project source files compiled using the compiler.

In some embodiments, an interpreter is used as an alternative to the compile. A compiler converts high-level source code into machine code to be executed on the microprocessor. An interpreter converts high-level scripted source code line-by-line in real-time for consumption by the microprocessor. The interpreter operates within a shell program or other software implementation of a virtual machine.

Interpreted languages include Python, Java, and other script-based languages, which are transformed from human-readable source code into native code consumed by the processor, at the time the script or bytecode is executed. Binary transformation systems are not primarily concerned with protecting the content of the script files, but rather the runtime interpreter. Vulnerabilities in the runtime interpreter can generate the types of exploitation opportunities that binary transformation systems can protect against.

It should be understood that for the purpose of testing the validity of a binary transformation system, the binaries of a run-time interpreter, such as python, and supporting library files (collectively referred to as the raw interpreter) can be transformed to create multiple unique versions of the interpreter. The unique versions of the transformed interpreter are subsequently referred to as BTS_Python1, BTS_Python 2, BTS_Python 3, and so on. Like the transformed compiler, the transformed interpreter is also subject to altered performance metrics and build-time artifacts, and therefore, it is not appropriate to assert the pass/fail criteria based on "absolute identical" results.

Because the interpreter reduces high-level code to lower-level code similar to a compiler, the embodiments disclosed herein can be applicable for interpreters.

It should be understood that the term "compiler," as used herein, includes all executables, libraries, batch files, and other files necessary for compilation.

Some of the embodiments disclosed herein are presented below in clause-based format.

1. A method of assessing the effectiveness and correctness of a binary transformation technique for cyberhardening program binaries against future cyberattacks, comprising:

receiving a plurality of project source files at a source code repository;

generating a transformed compiler by applying at least one binary transformation technique on a raw compiler;

generating raw compiler test results data and transformed compiler test results data based on processing, using one or more computer processors, the plurality of project source files through the raw compiler and the transformed compiler;

applying one or more bitmasks that are configured for selectively ignoring build-specific metadata included in the raw compiler test results data and the transformed compiler test results data;

performing a comparison of the raw compiler test results data and the transformed compiler test results data; and assessing impact of the at least one binary transformation technique based on characterizing computational performance of the raw compiler and the transformed compiler.

2. The method of clause 1, wherein the build-specific metadata included in the raw compiler test results data and the transformed compiler test results data includes information related to source project ID, compiler version, or time stamp.

3. The method of clause 1, wherein the processing the plurality of project source files through the raw compiler and the transformed compiler are further based on injecting, in the plurality of project source files, randomly-generated test cases for simulating one or more of: illegal code structures, illegal compiler flags, and illegal combinations of input files and compiler flags.

4. The method of clause 3, wherein the illegal code structures include unrecognizable input, corrupted files, wrong reserved words, and non-textual elements.

5. The method of clause 3, wherein the illegal compiler flags include flags are configured to generate an illegal operation error, in a case when the illegal compiler flags are used by the raw compiler or the transformed compiler during execution.

6. The method of clause 5, wherein the illegal compiler flags include one or more of: mistyping flags, incompatible flags that do not exist in a dictionary associated with the raw compiler or the transformed compiler, or missing files from flags that require a file input.

7. The method of clause 3, wherein the illegal combinations of input files and compiler flags include corrupted source files, unrecognizable input, wrong reserved words or structures, or non-textual elements.

8. The method of clause 1, wherein the at least one binary transformation technique included Basic Block Randomization (BBR), Stack Frame Randomization (SFR), Control-Flow Integrity (CFI), or a combination thereof.

9. The method of clause 1, wherein the plurality of project source files include source code written in a high-level language, compiler options and flags, compiler identification information, a target operating system running on the one or more computer processors, an architecture of the one or more computer processors, and project metadata.

10. The method of clause 1, wherein the target operating system running on the one or more computer processors includes Windows, Ubuntu, MacOS, or Linux, and wherein the architecture of the one or more computer processors include Intel x86 or x64, embedded systems with 8, 16, or 32-bit processor cores, and Power PC.

11. The method of clause 1, wherein the computational performance of the raw compiler and the transformed compiler is characterized based on memory utilization metrics, compilation time metrics, and a metric associated with utilization of the one or more processors.

12. The method of clause 1, wherein the build-specific metadata includes static build-time artifacts that remain unchanged in repeated compilations of the plurality of project source files regardless of whether the raw compiler or the transformed compiler is used for the compilations.

13. The method of clause 1, wherein the build-specific metadata includes dynamic build-time artifacts that change over repeated compilations of the plurality of project source files when the raw compiler or the transformed compiler is used for the compilations.

14. The method of clause 1, wherein the one or more bitmasks is a project-specific bitmask, further comprising:
computing differences between a binary generated from compilation on the raw compiler and a binary generated from compilation on the transformed compiler; and
upon determining from the differences that the binary generated from compilation on the raw compiler and the binary generated from compilation on the transformed compiler are functionally equal, generating the project-specific bitmask particularly applicable to the plurality of project source files.

15. The method of clause 1, wherein the one or more bitmasks is a compiler bitmask, further comprising:
determining location of artifact in a data file associated used in compilation of the plurality of project source files; and
upon determining the artifact, generating the compiler bitmask applicable to the plurality of project source files and another plurality of project source files.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media may include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments may be implemented as devices or modules using hardware circuits, software, or combinations thereof. For example, a hardware circuit implementation may include discrete analog and/or digital components that are, for example, integrated as part of a printed circuit board. Alternatively, or additionally, the disclosed components or modules may be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method of assessing the effectiveness and correctness of a binary transformation technique for cyberhardening program binaries against future cyberattacks, comprising:
receiving a plurality of project source files at a source code repository;
generating a transformed compiler by applying at least one binary transformation technique on a raw compiler;
generating raw compiler test results data and transformed compiler test results data based on processing, using one or more computer processors, the plurality of project source files through the raw compiler and the transformed compiler;
applying one or more bitmasks that are configured for selectively ignoring build-specific metadata included in the raw compiler test results data and the transformed compiler test results data;
performing a comparison of the raw compiler test results data and the transformed compiler test results data; and
assessing impact of the at least one binary transformation technique based on characterizing computational performance of the raw compiler and the transformed compiler.

2. The method of claim 1, wherein the build-specific metadata included in the raw compiler test results data and the transformed compiler test results data includes information related to source project ID, compiler version, or time stamp.

3. The method of claim 1, wherein the processing the plurality of project source files through the raw compiler and the transformed compiler are further based on injecting, in the plurality of project source files, randomly-generated test cases for simulating one or more of: illegal code structures, illegal compiler flags, and illegal combinations of input files and compiler flags.

4. The method of claim 3, wherein the illegal code structures include unrecognizable input, corrupted files, wrong reserved words, or non-textual elements.

5. The method of claim 3, wherein the illegal compiler flags include flags are configured to generate an illegal operation error, in a case when the illegal compiler flags are used by the raw compiler or the transformed compiler during execution.

6. The method of claim 5, wherein the illegal compiler flags include one or more of: mistyping flags, incompatible flags that do not exist in a dictionary associated with the raw compiler or the transformed compiler, or missing files from flags that require a file input.

7. The method of claim 3, wherein the illegal combinations of input files and compiler flags include corrupted source files, unrecognizable input, wrong reserved words or structures, or non-textual elements.

8. The method of claim 1, wherein the at least one binary transformation technique included Basic Block Randomization (BBR), Stack Frame Randomization (SFR), Control-Flow Integrity (CFI), or a combination thereof.

9. The method of claim 1, wherein the plurality of project source files include source code written in a high-level language, compiler options and flags, compiler identification information, a target operating system running on the one or more computer processors, an architecture of the one or more computer processors, or project metadata.

10. The method of claim 1, wherein the target operating system running on the one or more computer processors includes Windows, Ubuntu, MacOS, or Linux, and wherein the architecture of the one or more computer processors include Intel x86 or x64, embedded systems with 8, 16, or 32-bit processor cores, or Power PC.

11. The method of claim 1, wherein the computational performance of the raw compiler and the transformed compiler is characterized based on memory utilization metrics, compilation time metrics, or a metric associated with utilization of the one or more processors.

12. The method of claim 1, wherein the build-specific metadata includes static build-time artifacts that remain unchanged in repeated compilations of the plurality of project source files regardless of whether the raw compiler or the transformed compiler is used for the compilations.

13. The method of claim 1, wherein the build-specific metadata includes dynamic build-time artifacts that change over repeated compilations of the plurality of project source files when the raw compiler or the transformed compiler is used for the compilations.

14. The method of claim 1, wherein the one or more bitmasks is a project-specific bitmask, further comprising:
computing differences between a binary generated from compilation on the raw compiler and a binary generated from compilation on the transformed compiler; and
upon determining from the differences that the binary generated from compilation on the raw compiler and the binary generated from compilation on the transformed compiler are functionally equal, generating the project-specific bitmask particularly applicable to the plurality of project source files.

15. The method of claim 1, wherein the one or more bitmasks is a compiler bitmask, further comprising:
determining location of artifact in a data file associated used in compilation of the plurality of project source files; and
upon determining the artifact, generating the compiler bitmask applicable to the plurality of project source files and another plurality of project source files.

* * * * *